United States Patent
Fritz et al.

(10) Patent No.: US 11,150,816 B2
(45) Date of Patent: Oct. 19, 2021

(54) IMMUTABLE STORAGE FOR CLOUD SERVICE PROVIDERS

(71) Applicant: Microsoft Technology Licensing, LLC, Redmond, WA (US)

(72) Inventors: Krisjan David Fritz, Redmond, WA (US); Pratik Bhalgat, Woodinville, WA (US); Dhivakar Mani, Redmond, WA (US); Maneesh Sah, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 16/141,104

(22) Filed: Sep. 25, 2018

(65) Prior Publication Data
US 2020/0097195 A1      Mar. 26, 2020

(51) Int. Cl.
*G06F 3/00* (2006.01)
*G06F 3/06* (2006.01)

(52) U.S. Cl.
CPC ............ *G06F 3/0622* (2013.01); *G06F 3/067* (2013.01); *G06F 3/0647* (2013.01); *G06F 3/0652* (2013.01); *G06F 3/0665* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,275,639 | B2 * | 3/2016 | Shagalov | G10L 15/083 |
| 2011/0196822 | A1 * | 8/2011 | Zunger | G06F 16/27 707/609 |
| 2011/0196828 | A1 * | 8/2011 | Drobychev | G06F 16/275 707/622 |
| 2011/0196829 | A1 * | 8/2011 | Vickrey | G06F 16/275 707/622 |

(Continued)

OTHER PUBLICATIONS

"Store business-critical blob data with immutable storage," Nov. 18, 2019, https://docs.microsoft.com/en-US/azure/storage/blobs/storage-blob-immutable-storage. (Year: 2019).*

(Continued)

*Primary Examiner* — Farhan M Syed
(74) *Attorney, Agent, or Firm* — Mark K. Young; Mayer & Williams, PC

(57) ABSTRACT

A cloud service provider supports immutable data on its servers and the immutable data is movable across multiple access tiers, in which each access tier affects access performance and cost. In typical implementations, the immutable data may be blobs of unstructured data such as text or binary data, multimedia, among other data types, which are organized into containers that provide a directory for user interaction with the data. Policies are applied at the container-level which regulates user interactions with the containers and the container's blobs. A policy can, for example, prohibit modification and deletion of blobs within a container until a policy's set retention period expires. After expiration of the retention period, the container and that container's blobs may be deleted, but blob modification may (Continued)

still be prohibited. A user interface is configured to enable a user to move containers to other access tiers while the container maintains its policy.

20 Claims, 17 Drawing Sheets

(56) References Cited

U.S. PATENT DOCUMENTS

| | | | | |
|---|---|---|---|---|
| 2011/0196838 | A1* | 8/2011 | Zunger | G06F 16/182 |
| | | | | 707/636 |
| 2013/0191523 | A1* | 7/2013 | Buck | G06F 9/5066 |
| | | | | 709/223 |
| 2014/0081984 | A1* | 3/2014 | Sitsky | G06F 16/22 |
| | | | | 707/741 |
| 2014/0082749 | A1* | 3/2014 | Holland | G06F 21/645 |
| | | | | 726/29 |
| 2015/0120290 | A1* | 4/2015 | Shagalov | G10L 15/083 |
| | | | | 704/231 |
| 2016/0315965 | A1* | 10/2016 | Sastry | H04L 63/105 |
| 2018/0336210 | A1* | 11/2018 | Bourgeois | G06F 11/1451 |
| 2019/0034295 | A1* | 1/2019 | Bourgeois | G06F 11/1451 |
| 2019/0303031 | A1* | 10/2019 | Sabourin | G06F 16/00 |
| 2019/0339873 | A1* | 11/2019 | Mainali | G06F 3/065 |

OTHER PUBLICATIONS

Wood, Mike, "An Introduction to Windows Azure BLOB Storage," Jul. 12, 2013, https://www.red-gate.com/simple-talk/cloud/cloud-data/an-introduction-to-windows-azure-blob-storage/ (Year: 2013).*

Rahmati, Amir, Earlence Fernandes, Kevin Eykholt, Xinheng Chen, and Atul Prakash. "Heimdall: A Privacy-Respecting Implicit Preference Collection Framework." In Proceedings of the 15th Annual International Conference on Mobile Systems, Applications, and Services, pp. 453-463. 2017. (Year: 2017).*

"Delete Storage Account", Retrieved from: https://docs.microsoft.com/en-us/previous versions/azure/reference/hh264517(v=azure.100), Aug. 3, 2016, 3 Pages.

"Microsoft Azure Storage Team Blog", Retrieved from: https://blogs.msdn.microsoft.com/windowsazurestorage/, Retrieved on Oct. 5, 2018, 5 Pages.

"Set Up a Compliant Archive", Retrieved from: https://aws.amazon.com/getting-started/projects/set-up-compliant-archive/, Retrieved on Oct. 5, 2018, 7 Pages.

"Storage Accounts", Retrieved from: https://docs.microsoft.com/en-us/rest/api/storagerp/storageaccounts, Jul. 1, 2018, 2 Pages.

"Write-ahead logging", Retrieved from: https://en.wikipedia.org/wiki/Write-ahead_logging, Retrieved on Oct. 5, 2018, 1 Page.

Calder, et al., "Windows Azure Storage: A Highly Available Cloud Storage Service with Strong Consistency", In Proceedings of the Twenty-Third ACM Symposium on Operating Systems Principles, Oct. 23, 2011, pp. 143-157.

Hussain, et al., "Azure Blob storage: Premium (preview), hot, cool, and archive storage tiers", Retrieved from: https://docs,microsoft.com/en-us/azure/storage/blobs/storage-blob-storage-tiers, Sep. 11, 2018, 12 Pages.

Kemnetz, et al., "Archive the Azure Activity Log", Retrieved from: https://docs.microsoft.com/en-us/azure/monitoring-and-diagnostics/monitoring-archive-activity-log, Jun. 7, 2018, 11 Pages.

Kemnetz, et al., "Monitor Subscription Activity with the Azure Activity Log", Retrieved from: https://docs.microsoft.com/en-us/azure/monitoring-and-diagnostics/monitoring-overview-activity-logs, May 30, 2018, 15 Pages.

Kemnetz, et al., "Stream the Azure Activity Log to Event Hubs", Retrieved from: https://docs.microsoft.com/en-us/azure/monitoring-and-diagnostics/monitoring-stream-activity-logs-event-hubs, Jul. 25, 2018, 7 Pages.

Myers, et al., "Delete Container", Retrieved from: https://docs.microsoft.com/en-us/rest/api/storageservices/delete-container, Jun. 14, 2018, 6 Pages.

Myers, et al., "Introduction to Azure Storage", Retrieved from: https://docs.microsoft.com/en-us/azure/storage/storage-introduction, Jul. 11, 2018, 10 Pages.

Nagarajan, et al., "Alerts on activity log", Retrieved from: https://docs.microsoft.com/en-us/azure/monitoring-and-diagnostics/monitoring-activity-log-alerts, Sep. 17, 2018, 3 Pages.

Sparkman, et al., "Connect to Azure Audit Logs with Power BI", Retrieved from: https://docs.microsoft.com/en-us/power-bi/service-connect-to-azure-audit-logs, Feb. 6, 2018, 8 Pages.

* cited by examiner

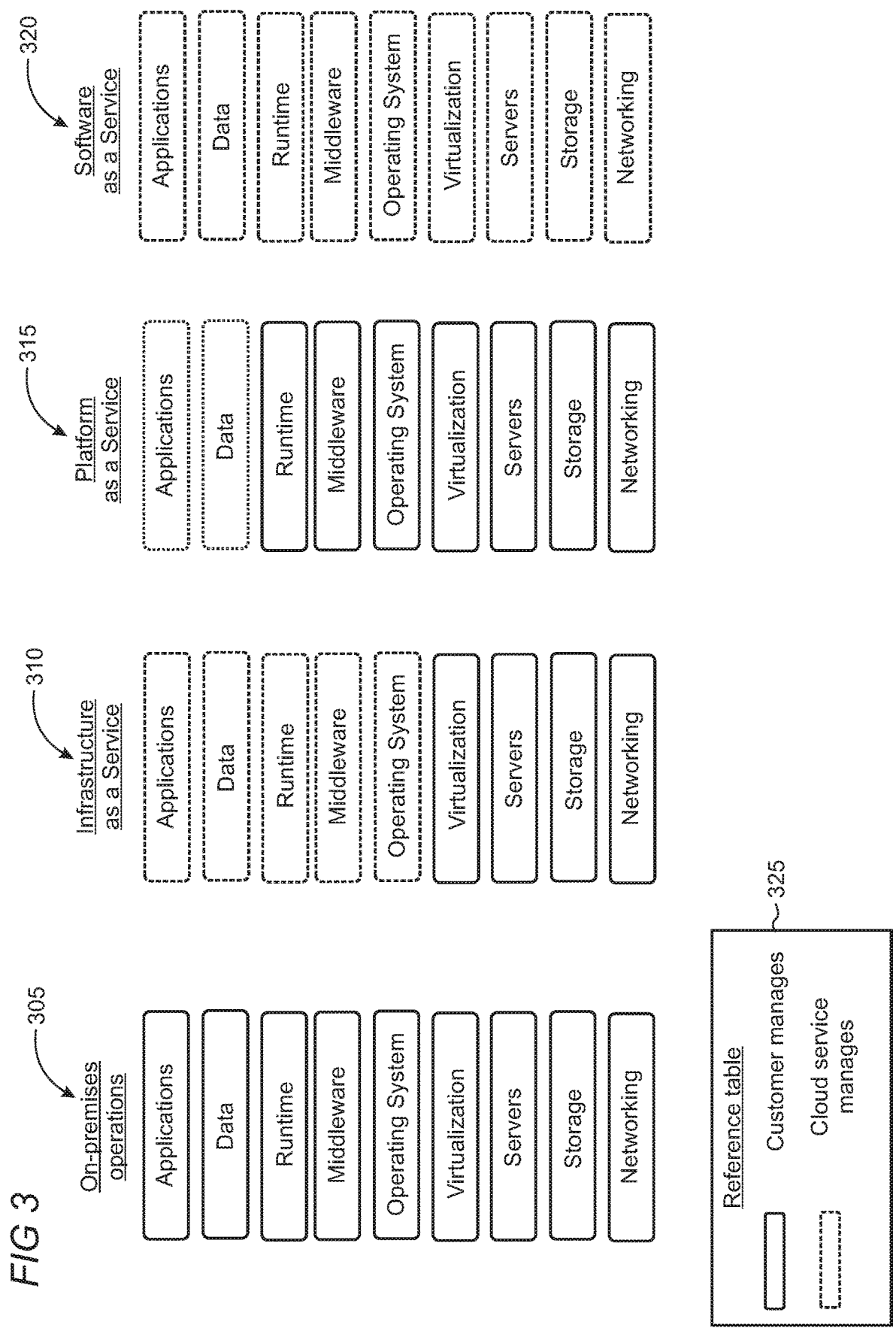

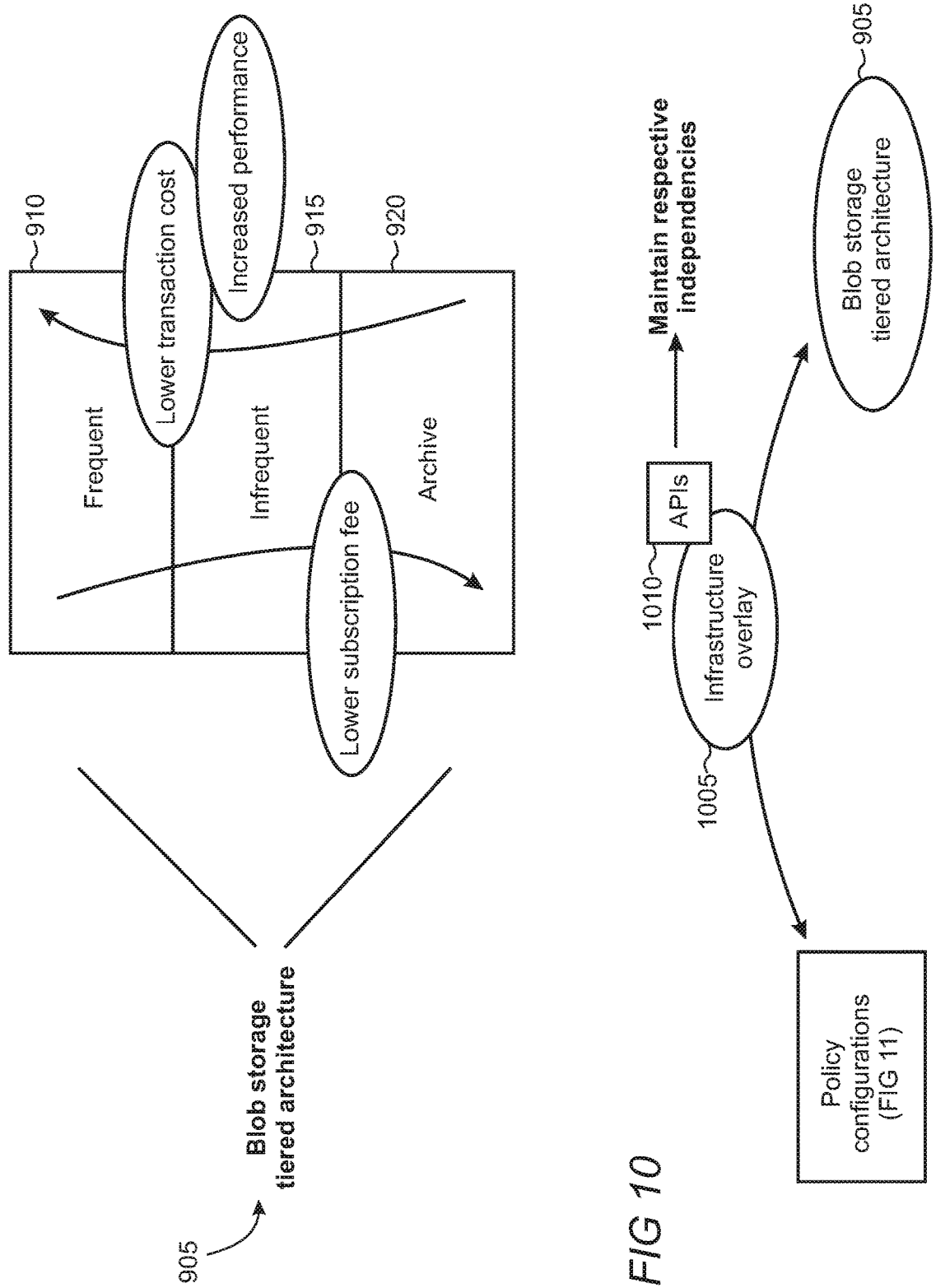

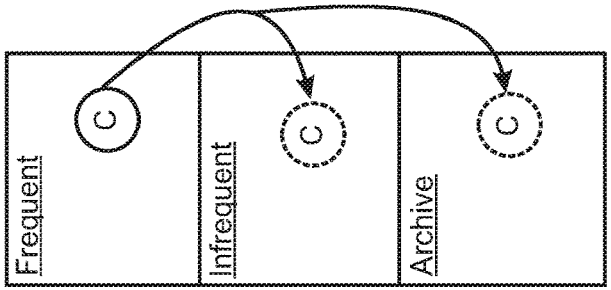
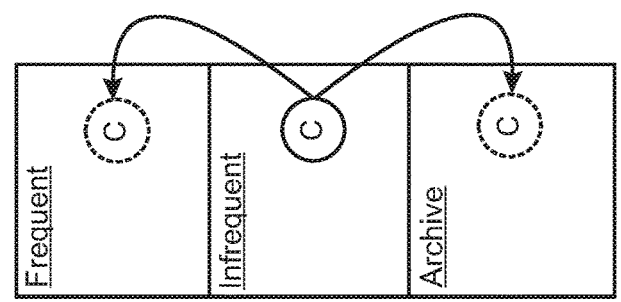
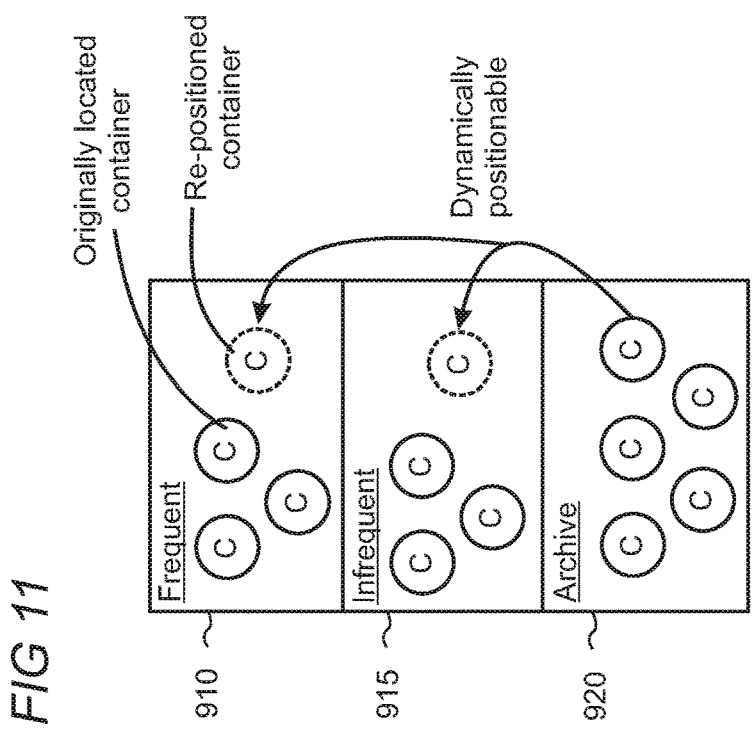
FIG 11

1400

1500

1700

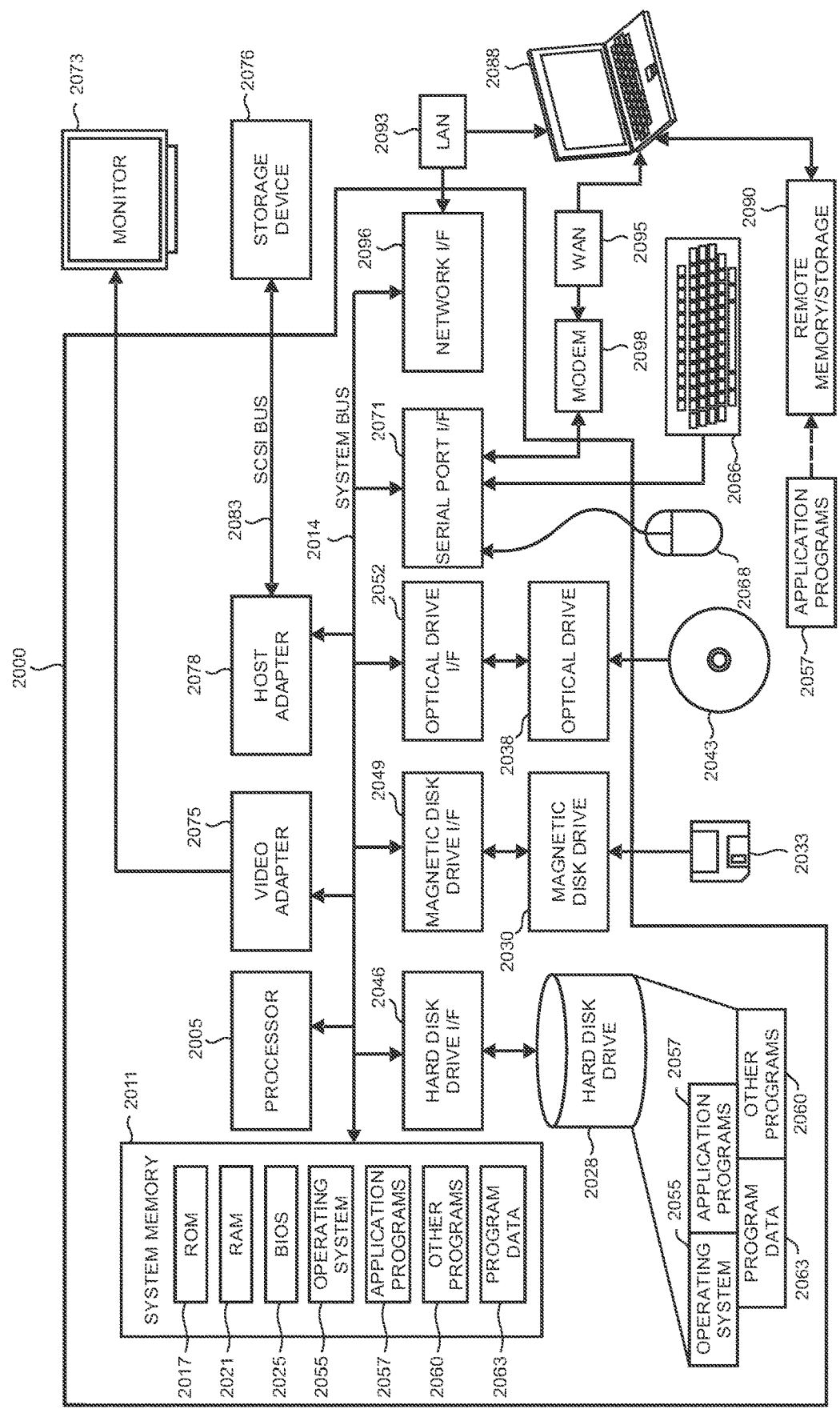

IMMUTABLE STORAGE FOR CLOUD SERVICE PROVIDERS

BACKGROUND

Cloud service providers offer a variety of services to customers' computing environments, including storage for files, tables, queues, and blobs which can be unstructured data such as text or binary data. Data generated by certain industries (e.g., the financial or medical industries) are regulated to protect consumers or facilitate oversight of the respective industry's actions. One such regulation is to make the data immutable, that is, non-erasable and non-modifiable.

Customer's leverage cloud service providers for the benefits that they offer, including the hardware infrastructure, application development and deployment, and fluid accessibility of data and applications across devices. Using a provider's storage to house immutably-regulated data can pose compliance problems if, for example, the customer elects to re-organize the remotely stored data.

SUMMARY

A cloud service provider supports a customer's immutable data on the provider's servers which offer multiple access tiers for the immutable data and are configured to, responsively to user input, switch the access tier in which the immutable data is contained while maintaining policy enforcement for the data. The immutable data may alternatively be considered Write Once, Read Many (WORM) which is utilized to reduce the possibility of data tampering. In an exemplary implementation, the immutable data may be blobs of immutable data stored within containers that provide a directory for organization and user interaction with the blobs. The blobs of data can include a range of data types, non-exhaustively including multimedia, documents, system backup data, log files, or metadata. Thus, the term blob may alternatively be referred to as a data object of varying data types and configurations and is not restricted to any particular data type or configuration. The access tier architecture includes multiple access tiers, each of which can deliver differing access rights and capabilities to the customer's computing device, including different read/write performance, transaction cost per access, and subscription fee per time period (e.g., monthly, quarterly, or yearly).

The access tier architecture is overlaid with policies which control the handling of the immutable data. The policies are customizable and apply at the container level to each of the blobs of data stored within the container. Policies prohibit deletion and modification of the blobs of data during a retention period that is set within the policy after the policy has been committed by a user. After the retention period expires the immutable data is deletable upon user input, but is still prohibited from modification according to the policy.

The overlaid architectures between the immutability policies and access tier infrastructure facilitate the container-level switching among the access tiers to thereby change the customer's access rights and capabilities for containers, while still maintaining immutable compliance of the blob data according to the policies associated with the containers. The access tier architecture and container policy configurations operate in tandem while maintaining their independence, thereby maintaining the retention period associated with the container but allowing the customer to change the blob's access rights based on the tier in which the user desires. Blobs are movable among different containers so long as the moved-to, or subsequent, container has a congruent policy as the blob's initial, or previous, container. Blobs cannot be deleted until expiration of the retention period and containers cannot be deleted until each blob is deleted or removed from within the container.

A user interface (UI) of a display on a customer's computing device is configured to provide indications of the access tier in which a container is located and receive user input to change access tiers for individual containers. For example, the user can select a button, drop-down menu, and the like on the UI which allows the user to switch the container's access tier—and thereby access rights and capabilities—while still maintaining compliance with the immutable policy associated with that container. Thus, the UI enables the user to alter his access rights (e.g., performance-access and cost-management) for containers without having to physically manage the storage of data.

The overlay of the access tier architecture with the container policy configuration facilitates customer-centric and dynamic accessibility of respective containers of immutable data while maintaining the independence of implemented policies for the respective containers. The customer is thereby not restricted to particular access rights provided by a given tier when the blob data is in an immutable state, but rather can leverage the array of services offered to customers via each of the respective tiers.

The unique UI on the customer's computing device also provides seamless integration between the customer's devices and the overlaid architectures. That is, indicators on the user's display can be used to identify a particular tier in which the container is located and the user's access rights to that container. Control mechanisms are implemented to enable the user to switch tiers and thereby access rights and capabilities to the container's data without physical movement of the data by the user. The UI integration, such as graphical user interface (GUI) integration, with the provider's backend storage operations accordingly affords the user greater access, control, and oversight of their own data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 3 shows an illustrative diagram of management services provided by the cloud service provider depending on a customer's setup;

FIG. 9 shows an illustrative diagram of a blob storage tiered architecture;

FIG. 10 shows an illustrative diagram in which the container policy configurations overlay with the tiered architecture;

FIG. 11 shows an illustrative environment in which containers are switchable among tiers within the tiered architecture;

FIG. 20 is a simplified block diagram of an illustrative computing system or server that may be used in part to implement the present immutable blob storage for cloud service providers.

Like reference numerals indicate like elements in the drawings. Elements are not drawn to scale unless otherwise indicated.

DETAILED DESCRIPTION

Figure 1:
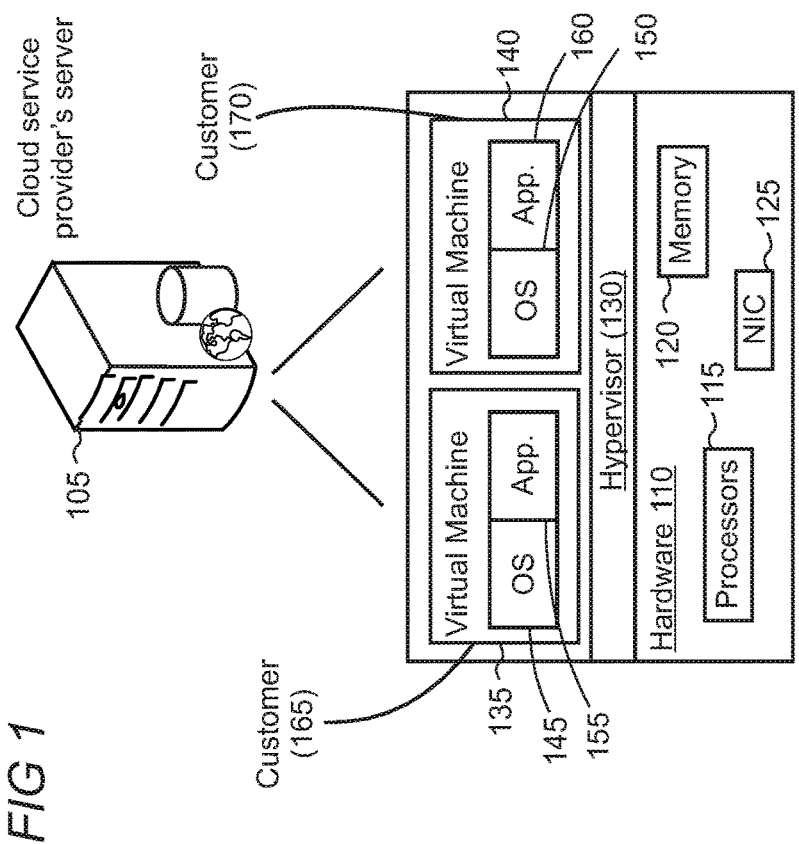
FIG. 1 shows an illustrative system architecture of a cloud service provider's server.

FIG. 1 shows an abstraction of an illustrative system architecture of a cloud service provider's server 105. At the hardware layer 110 the server may be configured with one or more processors 115 including central processing units (CPUs) and graphic processing units (GPUs) to perform various operations and computations. Memory 120 can include data and instructions to instruct the processors' operations, and a network interface card (NIC) 125 may provide access to the Internet to transmit, receive, and package data to and from other nodes of the network. A hypervisor 130 is installed and utilized by the server to execute one or more virtual machines on the server, which in this instance includes virtual machines 135 and 140. The hypervisor enables virtual machine operations by handling the allocation and utilization of virtual hardware for the respective virtual machines using the server's actual hardware, including processor, memory, and NIC usage.

The virtual machines can operate respective operating systems (OSs) 145 and 150 with respectively installed applications (Apps) 155 and 160. OSs which may operate on the virtual machines can include Windows®, Linux®, and SQL Server®, in which applications are those which are compatible with the operating system, whether developed by first or third parties. The use of virtual machines is one method which facilitates the multi-customer use of a cloud computing server, as illustratively shown by numerals 165 and 170. Customers 165 and 170 may be different customers which utilize different virtual machines operating on the same server.

Figure 2:
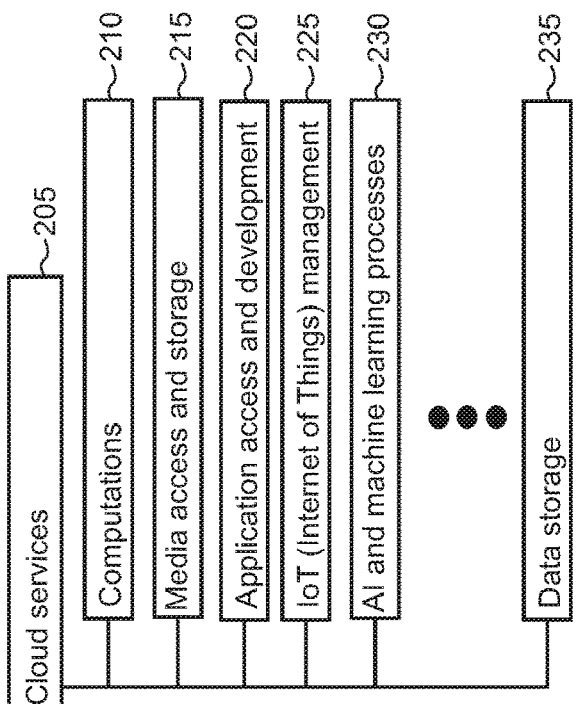
FIG. 2 shows an illustrative taxonomy of non-exhaustive services provided to customers by the cloud service provider.

FIG. 2 shows an illustrative taxonomy of cloud services 205 provided by a cloud service provider to a customer operating on-premises computing devices such as a server, laptop computer, desktop computer, smartphone, tablet computer, etc. Provided services can include computations 210, media access and storage 215, application access and development 220, IoT management 225, AI (Artificial Intelligence) and machine learning processes 230, and data storage 235, among other services.

FIG. 3 shows an illustrative diagram of management services offered by the cloud service provider depending on the unique customer's setup. Depending on the customer's subscription to the cloud service provider, certain responsibilities and/or tasks may be managed by the cloud service provider or the customer, as illustratively shown by using the table 325. On one end of the spectrum is on-premises operations 305 in which the customer manages all of the responsibilities and functions of local servers. On the other end of the spectrum is Software as a Service (SaaS) 320 in which the cloud service provider manages all of the responsibilities, such as providing web applications which run through an end user's web browser. Infrastructure as a Service (IaaS) 310 and Platform as a Service (PaaS) 315 provide a hybrid approach. Infrastructure as a Service enables users to access, monitor, and manage remote datacenters to avoid purchasing localized hardware. Platform as a Service enables users to provide cloud computing solutions while utilizing a framework from which they can develop or customize applications for users.

Figure 4:
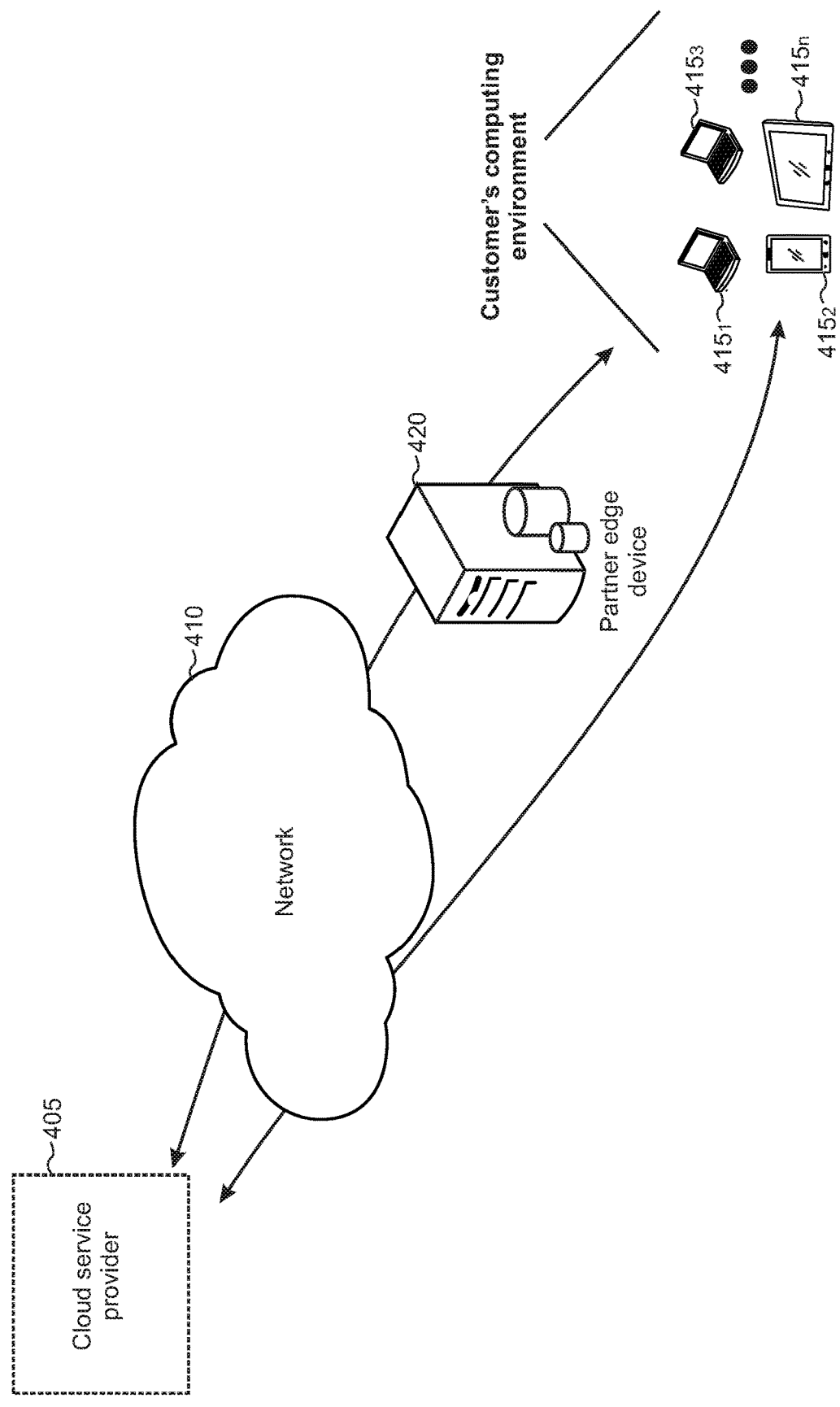
FIG. 4 shows an illustrative environment of the cloud service provider's operability with a customer's network.

FIG. 4 shows an illustrative environment in which a cloud service provider 405 interacts over a network 410 with a customer's computing environment including client devices 415. In some implementations the customer's computing environment can include a partner edge device 420 which may be utilized by the various client devices and perform its own operations separate from the cloud service provider.

Figure 5:
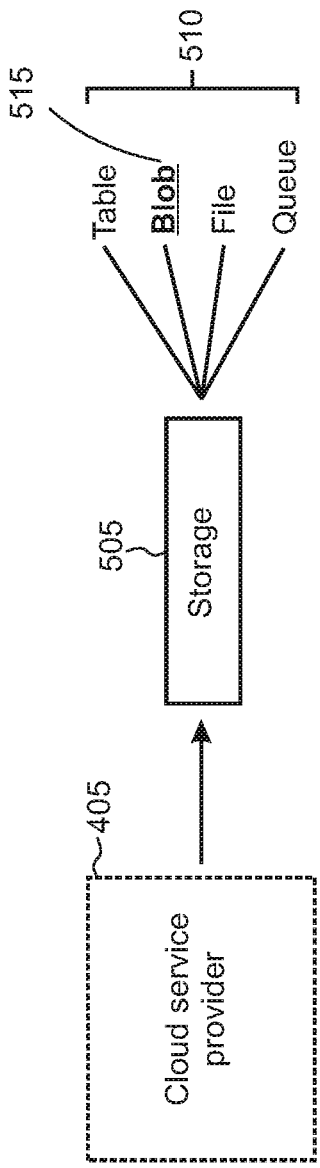
FIG. 5 shows illustrative types of data which can be stored by the cloud service provider.

FIG. 5 shows an illustrative diagram in which the cloud service provider 405 provides storage 505 for a variety of data types 510 including tables, blobs, files, and queues. Blobs of data, as representatively shown by numeral 515, may be optimized for storing large amounts of unstructured data, such as text or binary data. Exemplary blobs can include storing images or documents to be served to a user's browser, files for distributed access, multimedia such as video and audio, log files, and system backup data and archives. Blobs may be accessible by users associated with a customer using, for example, a web browser on the user's computing device, e.g., tablet computer, personal computer, and smartphone. Other data types may also be used for the present implementation, such as those listed in FIG. 5. Thus, blobs of data can alternatively be referred to as data objects to represent the alternative types of data for which the present disclosure can be utilized.

Figure 6:
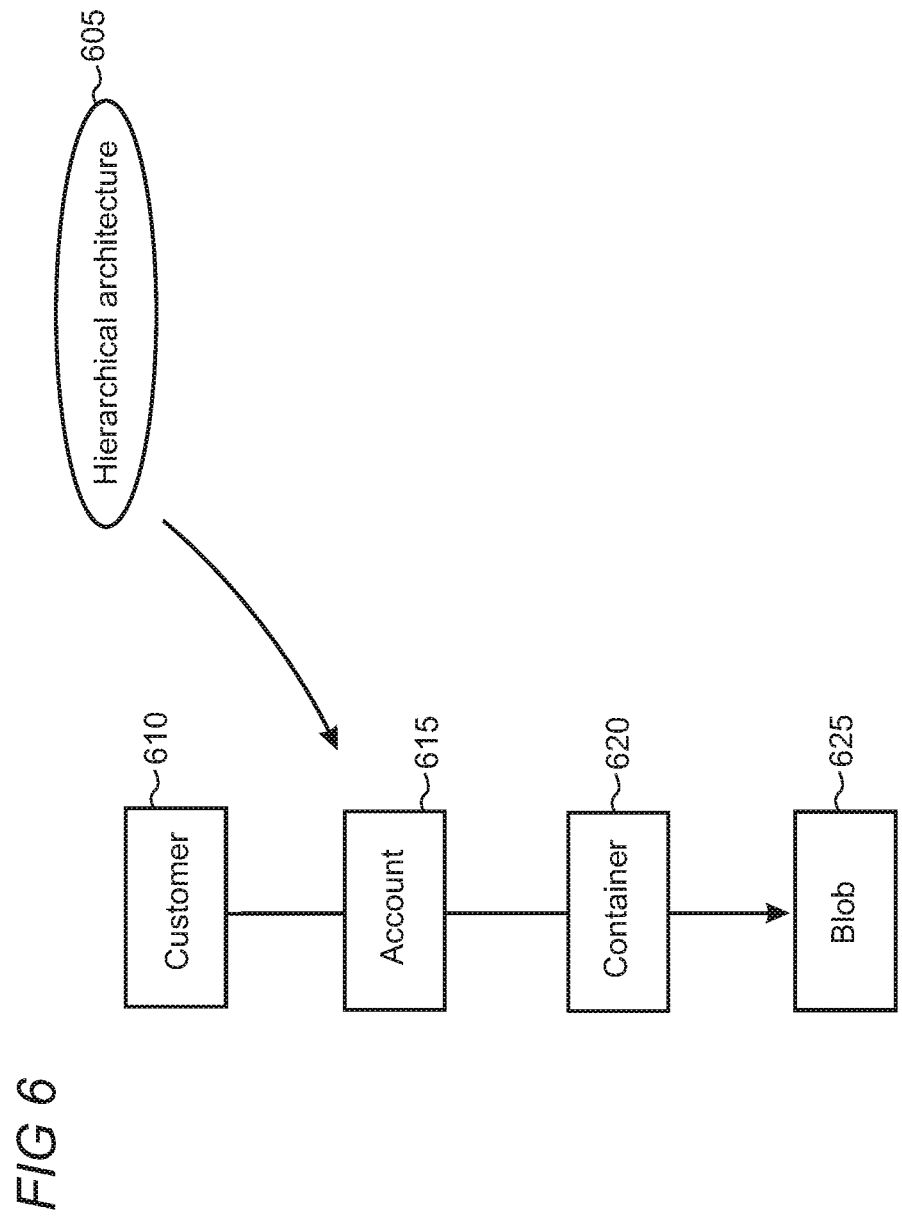
FIGS. 6 and 7 show illustrative hierarchical architecture for blob storage that may be used by the cloud service provider.
Figure 7:
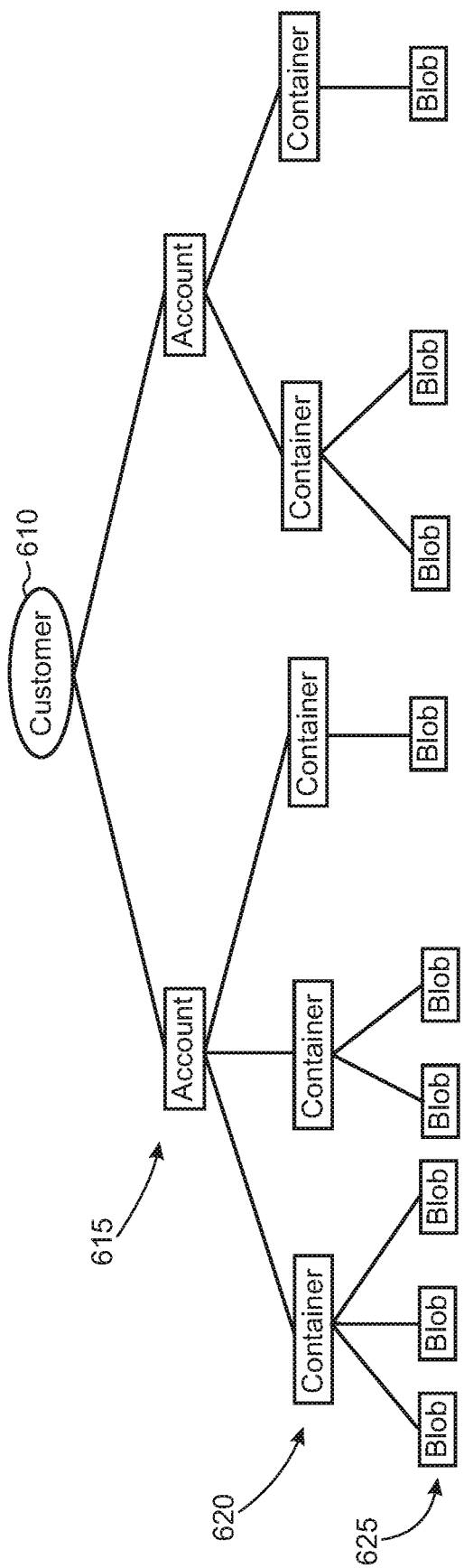

FIGS. 6 and 7 show exemplary implementations of a hierarchical architecture 605 for blob storage supported by the provider, in which FIG. 6 provides a simplistic view of that which is contained in FIG. 7. A customer 610 can possess one or more accounts 615, and each account can have one or more containers 620. The blobs 625 of data are stored in the containers. The containers organize the blobs and operate as a directory for the user to access and interact with the blobs. Blobs are movable among containers when, as discussed in greater detail below, the containers support congruent policies which regulate the blobs.

Figure 8:
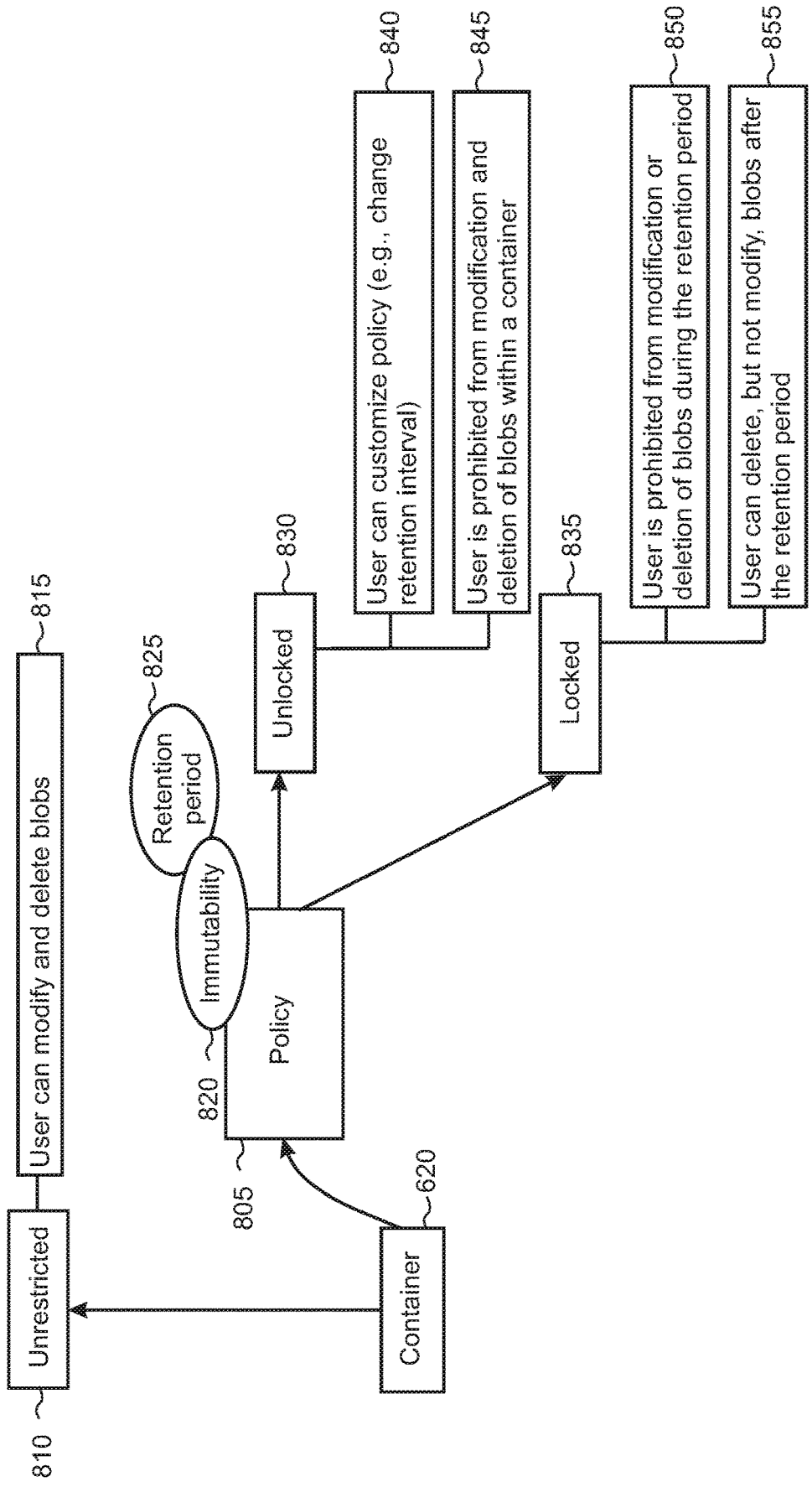
FIG. 8 shows an illustrative diagram in which a policy may be applied to a container.

FIG. 8 shows an illustrative diagram in which containers 620 can be associated with a policy 805 or be unrestricted 810 depending on the customer's configuration. An unrestricted container enables a user to modify or delete blobs without restriction, as illustratively shown by numeral 815. When a policy is created it is applied at the container level, which thereby makes the policy applicable to each blob within the container. Once the policy is committed (e.g., selected and/or applied to a container by a user), the policy can make the container and its blobs immutable 820 for a retention period 825. Immutability signifies that the blobs are prohibited from being deleted or modified. The expiration of the retention period is calculated using the date on which the policy is created plus the duration of time for retaining the data that is input by the user.

In typical implementations, there can be two types of applicable policies, unlocked 830 and locked 835. An unlocked policy enables a user to customize the policy (e.g., change the duration of the retention interval) 840, but the user is prohibited from modification or deletion of blobs within the container 845. When the policy is created it may be automatically configured into an unlocked state to allow the user to adjust criteria within the policy, such as the retention period. The user can subsequently switch the unlocked state to a locked state.

A policy in the locked state prohibits the user from modification or deletion of the blobs during the retention period 850. After the retention period the user can delete, but not modify, the blobs 855. Containers can be deleted after each blob within the container has been deleted or moved to another container (i.e., the container is empty).

Policies are auditable and can be controlled with role-based access control (RBAC). For example, authorized users having the proper credentials can commit a policy, customize a policy, set the retention period within the policy, change the state of the policy from unlocked to locked, and control other criteria associated with the policy. Policy audit logs may also be maintained by the cloud service provider to keep records of the committed policies applied to containers and blobs of data.

FIG. 9 shows an illustrative environment of the tiered architecture on the provider's servers for blob storage, as representatively shown by numeral 905. The blob storage tiers include a frequent access tier 910, infrequent access tier 915, and an archive tier 920. Each tier is associated with differing access rights and capabilities for the customer to the blob data, including read/write performance, transaction cost per customer access, and subscription fee per time period (e.g., monthly, quarterly, or yearly). For example, in FIG. 9 as the user's blob data moves upward to the frequent access tier, the user can experience lower transaction costs and increased read/write access performance relative to lower tiers. As the user's blob data moves downward to the archive access tier, the user can experience lower subscription fees relative to the higher tiers at the expense of increased transaction cost and lower access performance. For example, the archive tier may be utilized as an off-line or backup storage mechanism for low cost and low retrieval performance. While three tiers are shown in FIG. 9, more or less access tiers each with distinct access rights and capabilities can also be implemented.

The differing access rights and capabilities for the user may occur, for example, because each access tier is associated with differing hardware or software which thereby affects the performance of data transmissions and server processing and computations. For example, higher performance memory devices like solid state drives and greater performance processors can be implemented for the frequent access tier. Lower performance memory devices like magnetic tape and lower performance processors can be implemented for the archive storage tier. The hardware and software for the infrequent access tier may provide a mid-level hybrid approach for the user's data.

FIG. 10 shows an illustrative abstraction in which the container policy configurations as depicted in FIG. 11 overlay with the blob storage tiered architecture 905 depicted in FIG. 9, as representatively shown by numeral 1005. An application programming interface (API) 1010 can be configured and utilized to leverage the capabilities offered by both configurations while maintaining their respective independent functions. For example, containers can continue to be controlled and handled according to the associated policies, while simultaneously being movable across access tiers to alter the performance, storage, and costs associated with containers, as discussed in greater detail below with respect to FIGS. 11-17.

FIG. 11 shows an illustrative environment in which containers are dynamically movable among access tiers. Responsive to user input, the containers and access tiers are configured to enable users to move containers among each access tier. The containers encircled in a solid line represent an original, or at least current, location of the containers, and the containers encircled in broken lines represent a new, or subsequent, location of the container after switching tiers. Upon switching tiers, the access rights for the container change to the tier to which the container was moved. For example, changes to the access rights can include the transaction cost, performance per access (e.g., data object retrieval or writing if no policy is in place) and the subscription fee. Furthermore, the policy associated with the container follows the container into whichever tier it is located. Thus, while the access rights associated with the container may change, the policy is maintained at least for the duration of the retention period.

Figure 12:
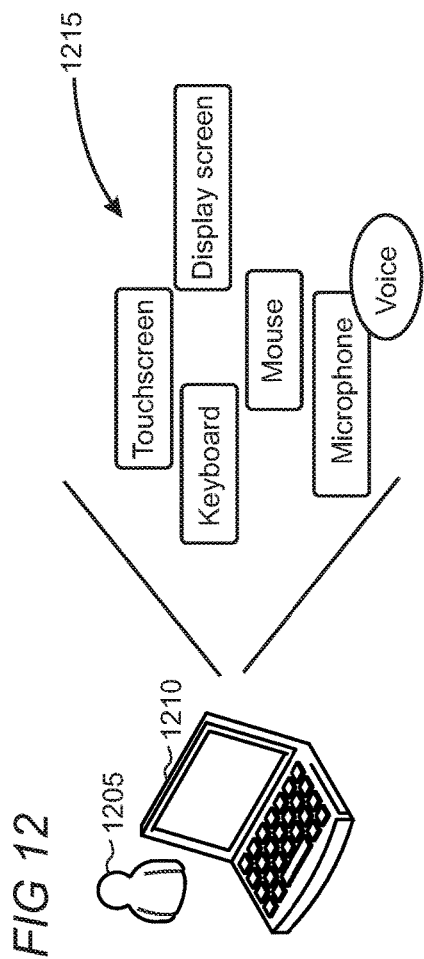
FIG. 12 shows exemplary user interface mechanisms configured to output information to and receive input from the user.

FIG. 12 shows exemplary user interface mechanisms 1215 that can be implemented by a customer's computing device 1210 and used by a user 1205. The user can use the user interface mechanisms to observe data and information associated with his account, such as containers, blobs of data within the containers, data creation date, and the like. The user can also utilize the user interface mechanisms to observe and utilize the infrastructure overlay API (FIG. 10) between the policy configurations and the blob storage tiered architecture, such as switching containers among the tiers to alter the user's access rights and capabilities to the blob data.

Figure 13:
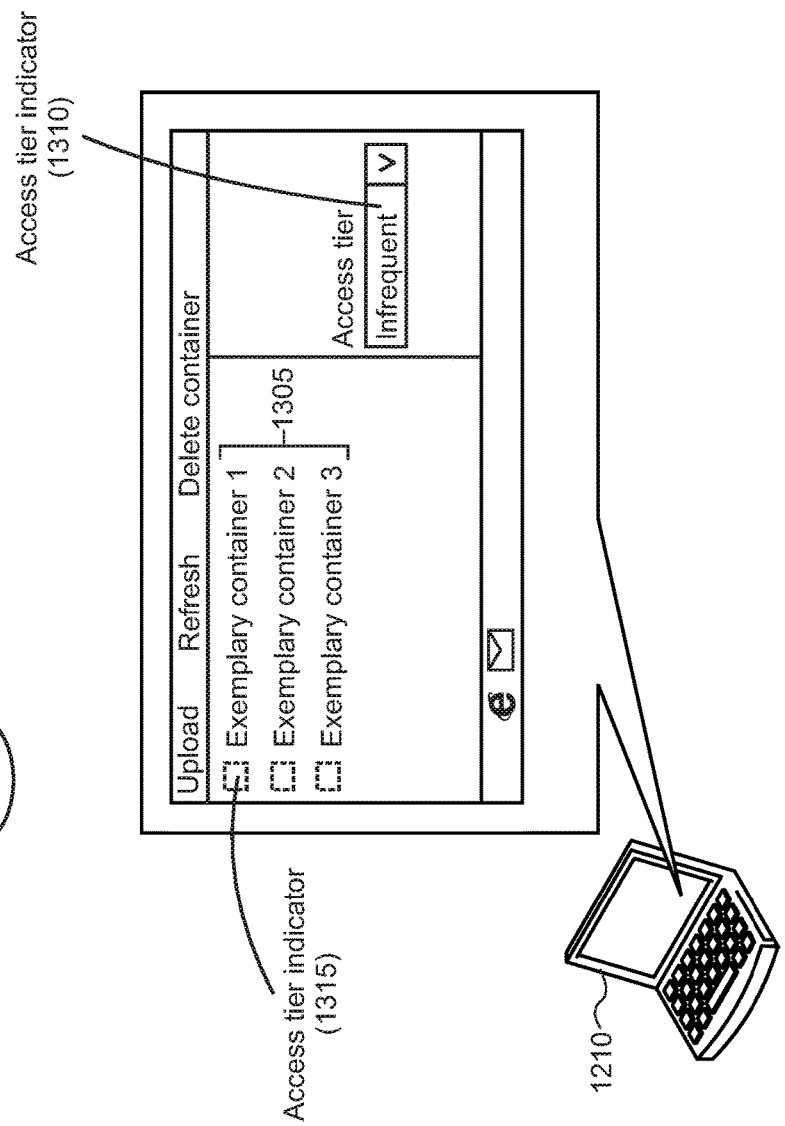
FIG. 13 shows an illustrative graphical user interface with indicators to enable user interaction with the overlaid architectures.

FIG. 13 shows an illustrative environment in which indicators are utilized on the graphical user interface (GUI) to enable user interactions with the overlaid architectures and thereby create a user-friendly environment in which the user can possess control over the containers and blob data. The graphical user interface of the computing device 1210 depicts a series of exemplary containers as representatively illustrated by numeral 1305. An access tier indicator showing in which access tier the respective containers are located can be displayed on the GUI as representatively shown by numerals 1310 and 1315.

The access tier indicator 1315 can show the access tier associated with the container via verbiage, color, graphic depiction or image, and the like. Access tier indicator 1310 illustratively shows the access tier associated with the container via a drop-down menu, using which the user is able to change the access tier for the respective container and visualize the current access tier with which the container is associated. The implementation of the GUI elements and indicators provides visualization of the interwoven infrastructures of the immutability policies and the access tiers, while simultaneously enabling the user to interact with both infrastructures to, for example, alter the user's access rights to the containers and blobs.

Figure 14:
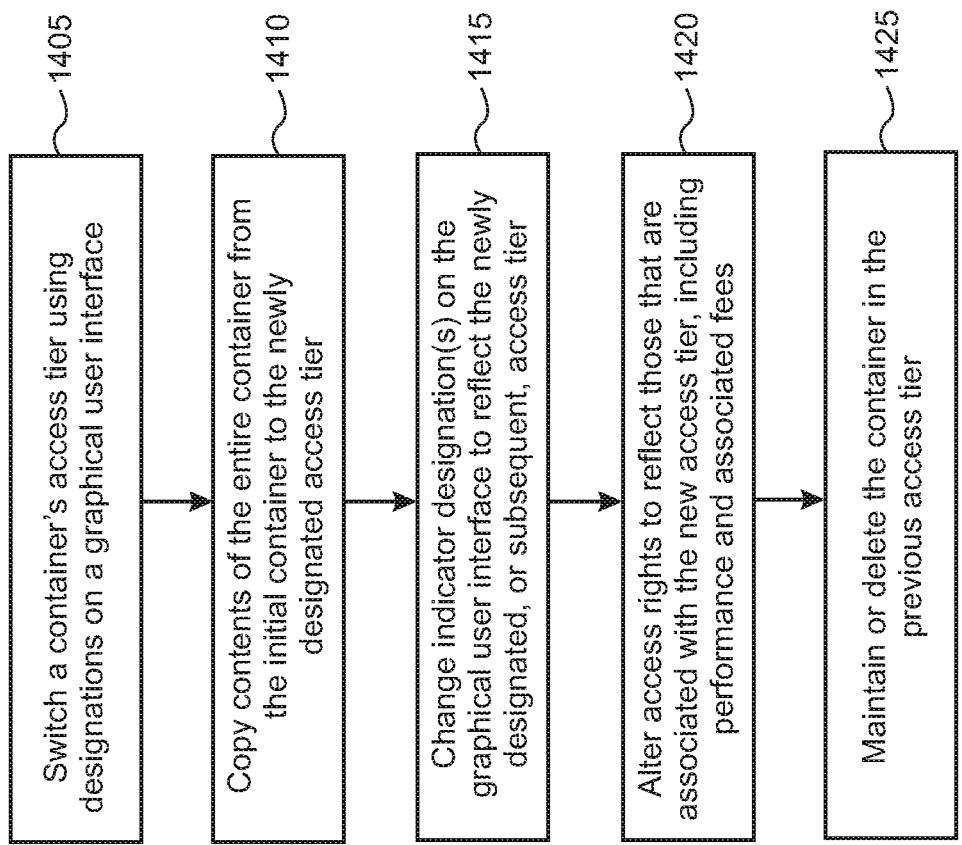
FIGS. 14-17 show illustrative processes performed by the provider's servers operating individually or collectively with the customer's one or more computing devices.

FIG. 14 is a flowchart of an illustrative method 1400 in which a cloud service provider and customer's computing device perform to alter the user's access rights and capabilities for a container. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1405, a user switches a container's access tier using graphical user interface elements on the computing device. In step 1410, contents of the entire container are copied from the initial access tier to the newly designated access tier. The newly designated access tier may utilize different hardware and be stationed at different servers which thereby provides the differing access rights and capabilities. In step 1415, an indicator designation on the graphical user interface is changed to reflect the newly designated, or subsequent, access tier with which the container is associated. In step 1420, the access rights for the container are altered to reflect those that are associated with the new access tier, including processing performance and associated fees (e.g., transaction costs and subscription fees). In step 1425, the container in the previous access tier is either maintained or deleted. For example, the provider may determine whether or not sufficient copies are maintained as backup before deleting. If deleting the container would decrease the number of copies below that which is desired, then the copy may be maintained. If sufficient copies are already stored, then the container may be deleted.

Figure 15:
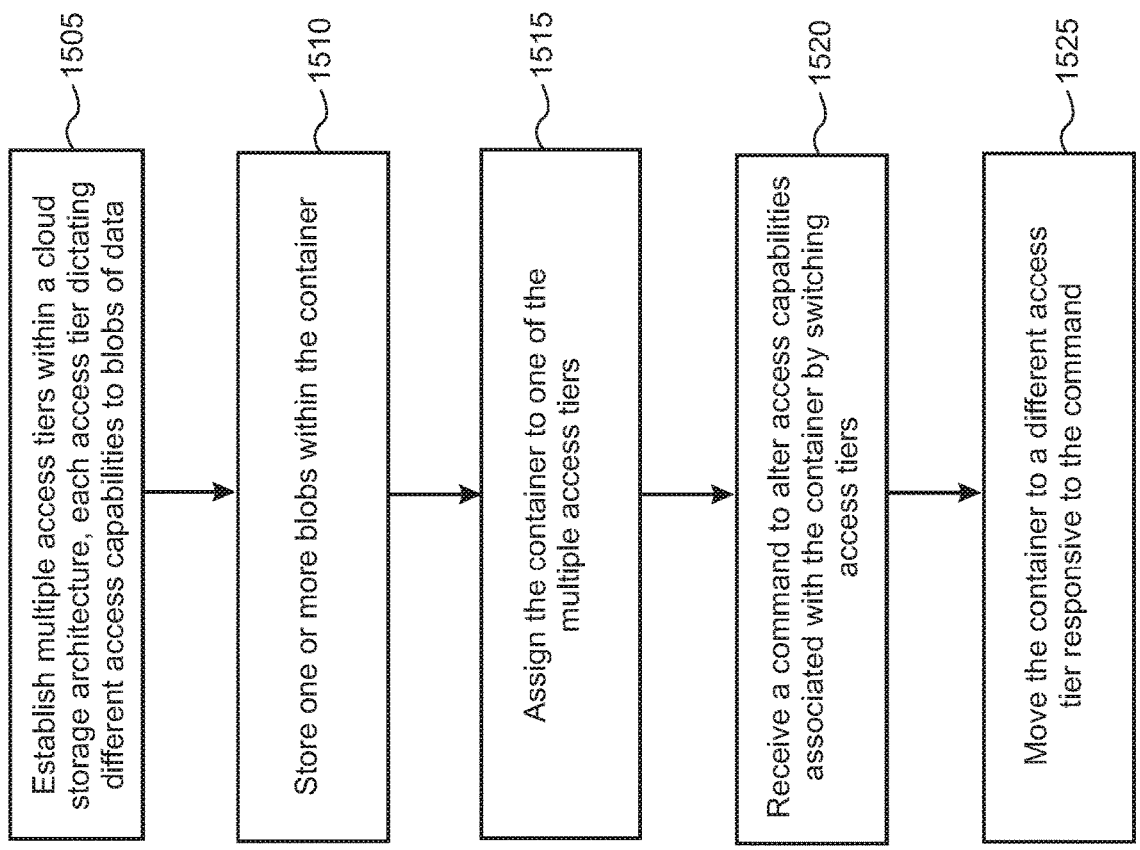

FIG. 15 is a flowchart of a method 1500 performed by a remote server to switch a container's access tier. In step 1505, multiple access tiers are established within a cloud storage architecture, each access tier dictating different access capabilities to blobs of data. In step 1510, one or more blobs are stored within a container. In step 1515, the container is assigned to one of the multiple access tiers. In step 1520, a command is received to alter access capabilities associated with the container by switching access tiers. In step 1525, the container is moved to a different access tier responsive to the command.

Figure 16:
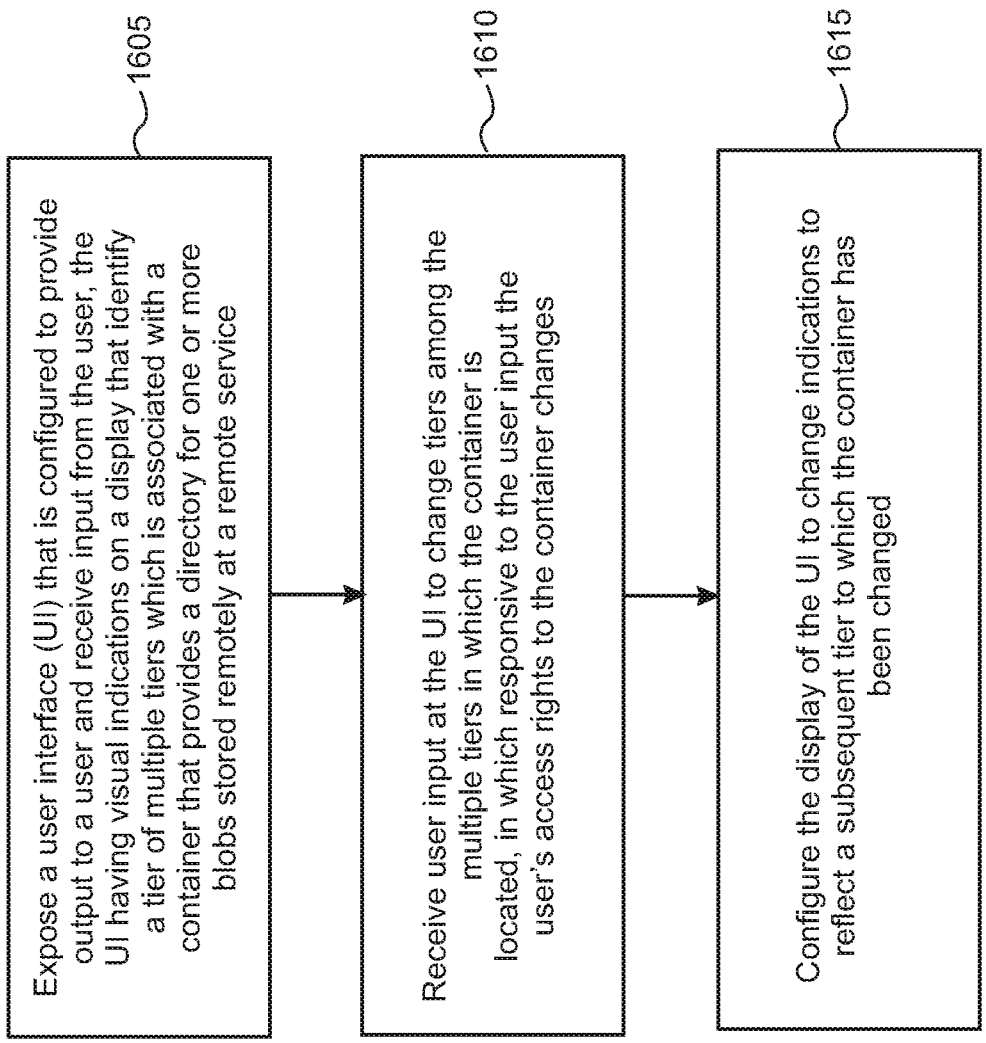

FIG. 16 is a flowchart of a method 1600 performed by a customer's computing device to enable the customer to alter access rights and capabilities for containers. In step 1605, a user interface (UI) is exposed that is configured to provide output to a user and receive input from the user. The UI has visual indications on a display that identify a tier of multiple tiers that is associated with a container, in which the container provides a directory for one or more blobs that are stored remotely at a remote service. In step 1610, user input is received at the UI to change tiers among the multiple tiers in which the container is located, and responsive to the user input the user's access rights to the container changes. In step 1615, the display of the UI is configured to change indications to reflect a subsequent tier to which the container has been changed.

Figure 17:
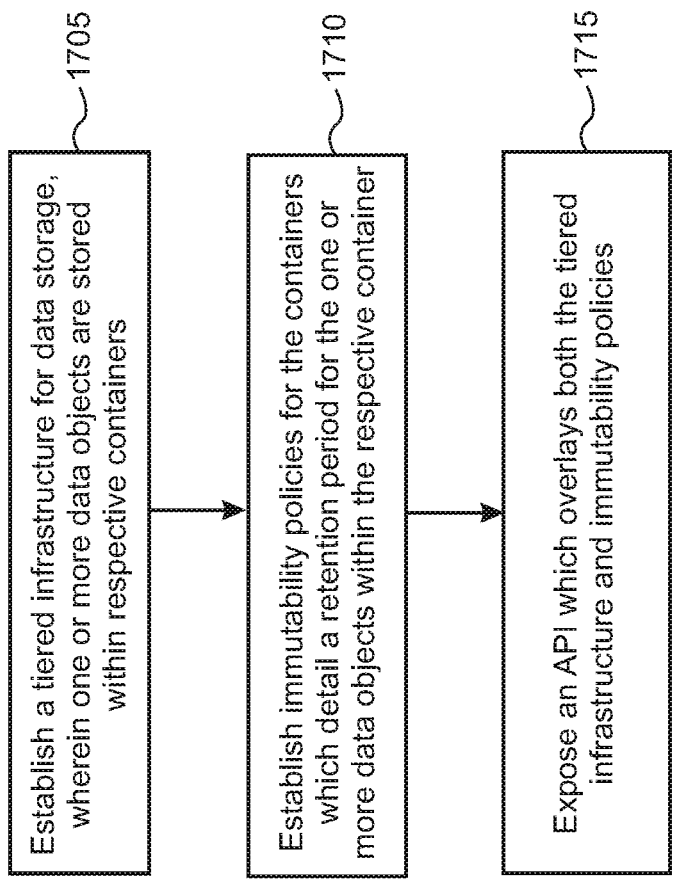

FIG. 17 is a flowchart of a method 1700 that is performed by a cloud service provider. In step 1705, a tiered infrastructure is established for data storage, in which one or more data objects are stored within respective containers. In step 1710, immutability policies for the containers are established which detail a retention period for the one or more data objects within the respective container. In step 1715, an application programming interface (API) is exposed which overlays both the tiered infrastructure and immutability policies configuration.

Figure 18:
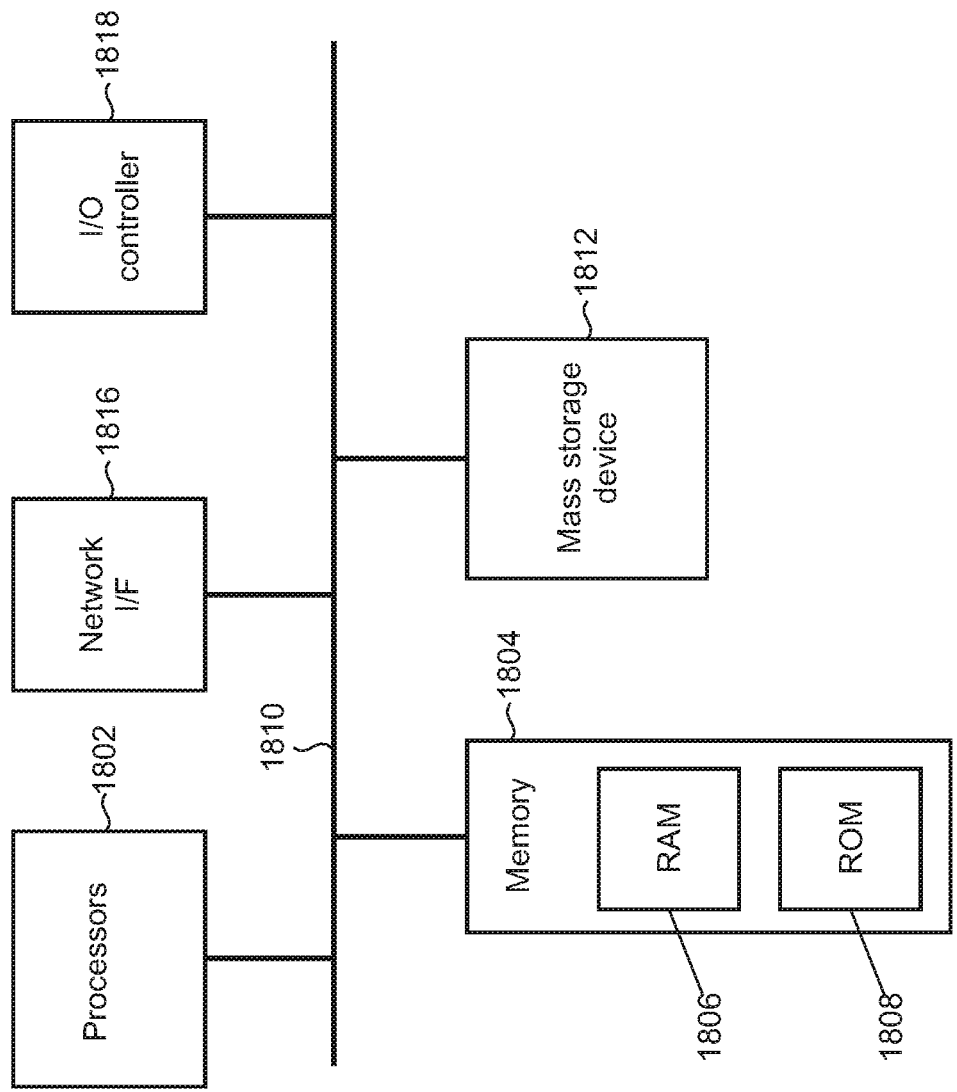
FIG. 18 is a simplified block diagram of an illustrative computer system that may be used in part to implement the present immutable blob storage for cloud service providers.

FIG. 18 shows an illustrative architecture 1800 for a device, such as a server, capable of executing the various components described herein for immutable blob storage for cloud service providers. The architecture 1800 illustrated in FIG. 18 includes one or more processors 1802 (e.g., central processing unit, dedicated AI chip, graphics processing unit, etc.), a system memory 1804, including RAM (random access memory) 1806 and ROM (read only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device 1812 for storing software code or other computer-executed code that is utilized to implement applications, the file system, and the operating system. The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, control devices such as buttons and switches or electronic stylus (not shown in FIG. 18). Similarly, the input/output controller 1818 may provide output to a display screen, user interface, a printer, or other type of output device (also not shown in FIG. 18).

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine, in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Figure 19:
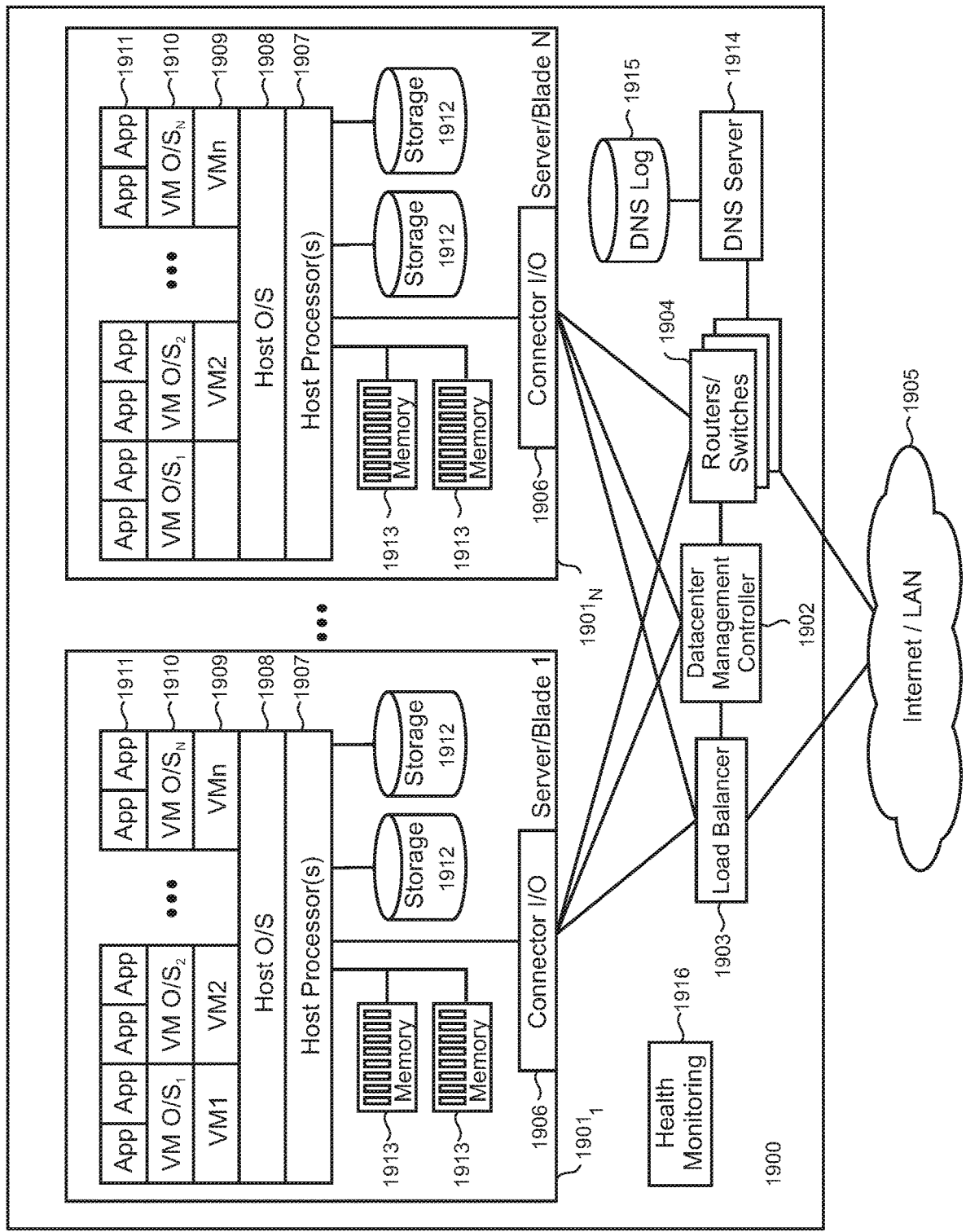
FIG. 19 is a block diagram of an illustrative datacenter that may be used at least in part to implement the present immutable blob storage for cloud service providers.

FIG. 19 is a high-level block diagram of an illustrative datacenter 1900 that provides cloud computing services or distributed computing services that may be used to implement the present immutable blob storage for cloud service providers. A plurality of servers 1901 are managed by datacenter management controller 1902. Load balancer 1903 distributes requests and computing workloads over servers 1901 to avoid a situation wherein a single server may become overwhelmed. Load balancer 1903 maximizes available capacity and performance of the resources in datacenter 1900. Routers/switches 1904 support data traffic between servers 1901 and between datacenter 1900 and external resources and users (not shown) via an external network 1905, which may be, for example, a local area network (LAN) or the Internet.

Servers 1901 may be standalone computing devices, and/or they may be configured as individual blades in a rack of one or more server devices. Servers 1901 have an input/output (I/O) connector 1906 that manages communication with other database entities. One or more host processors 1907 on each server 1901 run a host operating system (O/S) 1908 that supports multiple virtual machines (VM) 1909. Each VM 1909 may run its own O/S so that each VM O/S 1910 on a server is different, or the same, or a mix of both. The VM O/S's 1910 may be, for example, different versions of the same O/S (e.g., different VMs running different current and legacy versions of the Windows® operating system). In addition, or alternatively, the VM O/S's 1910 may be provided by different manufacturers (e.g., some VMs running the Windows® operating system, while other VMs are running the Linux® operating system). Each VM 1909 may also run one or more applications (Apps) 1911. Each server 1901 also includes storage 1912 (e.g., hard disk drives (HDD)) and memory 1913 (e.g., RAM) that can be accessed and used by the host processors 1907 and VMs 1909 for storing software code, data, etc. In one embodiment, a VM 1909 may employ the data plane APIs as disclosed herein.

Datacenter 1900 provides pooled resources on which customers can dynamically provision and scale applications as needed without having to add servers or additional networking. This allows customers to obtain the computing resources they need without having to procure, provision, and manage infrastructure on a per-application, ad-hoc basis. A cloud computing datacenter 1900 allows customers to scale up or scale down resources dynamically to meet the current needs of their business. Additionally, a datacenter operator can provide usage-based services to customers so that they pay for only the resources they use, when they need to use them. For example, a customer may initially use one VM 1909 on server $1901_1$ to run their applications 1911. When demand for an application 1911 increases, the datacenter 1900 may activate additional VMs 1909 on the same server $1901_1$ and/or on a new server $1901_N$ as needed. These additional VMs 1909 can be deactivated if demand for the application later drops.

Datacenter 1900 may offer guaranteed availability, disaster recovery, and back-up services. For example, the datacenter may designate one VM 1909 on server $1901_1$ as the primary location for the customer's application and may activate a second VM 1909 on the same or different server as a standby or back-up in case the first VM or server $1901_1$ fails. Datacenter management controller 1902 automatically shifts incoming user requests from the primary VM to the back-up VM without requiring customer intervention. Although datacenter 1900 is illustrated as a single location, it will be understood that servers 1901 may be distributed to multiple locations across the globe to provide additional redundancy and disaster recovery capabilities. Additionally, datacenter 1900 may be an on-premises, private system that provides services to a single enterprise user or may be a publicly accessible, distributed system that provides services to multiple, unrelated customers or may be a combination of both.

Domain Name System (DNS) server 1914 resolves domain and host names into IP (Internet Protocol) addresses for all roles, applications, and services in datacenter 1900. DNS log 1915 maintains a record of which domain names have been resolved by role. It will be understood that DNS is used herein as an example and that other name resolution services and domain name logging services may be used to identify dependencies.

Datacenter health monitoring 1916 monitors the health of the physical systems, software, and environment in datacenter 1900. Health monitoring 1916 provides feedback to datacenter managers when problems are detected with servers, blades, processors, or applications in datacenter 1900 or when network bandwidth or communications issues arise.

FIG. 20 is a simplified block diagram of an illustrative computer system 2000 such as a PC, client machine, or server with which the present immutable blob storage for cloud service providers may be implemented. Computer system 2000 includes a processor 2005, a system memory 2011, and a system bus 2014 that couples various system components including the system memory 2011 to the processor 2005. The system bus 2014 may be any of several types of bus structures including a memory bus or memory controller, a peripheral bus, or a local bus using any of a variety of bus architectures. The system memory 2011 includes read only memory (ROM) 2017 and random access memory (RAM) 2021. A basic input/output system (BIOS) 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer-readable storage media provide non-volatile storage of computer-readable instructions, data structures, program modules, and other data for the computer system 2000. Although this illustrative example includes a hard disk, a removable magnetic disk 2033, and a removable optical disk 2043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present immutable blob storage for cloud service providers. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2005 through a serial port interface 2071 that is coupled to the system bus 2014, but may be connected by other interfaces, such as a parallel port, game port, or universal serial bus (USB). A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface (SCSI) bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network (LAN) 2093 and a wide area network (WAN) 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of the present immutable blob storage for cloud service providers.

Various exemplary embodiments of the present immutable blob storage for cloud service providers are now presented by way of illustration and not as an exhaustive list of all embodiments. An example includes a method performed by a computer server to dynamically switch access tiers for blobs of data within a cloud storage architecture, comprising: establishing multiple access tiers within the cloud storage architecture, each access tier dictating different storage methods for and access capabilities to the blobs of data stored within the respective access tier, the access tiers including a frequent tier, infrequent tier, and archive tier, in which the archive tier provides back-up storage services, and the frequent and infrequent tiers provide read and write access to the blobs of data, wherein the frequent tier provides relatively greater access performance than the infrequent tier; establishing a container which is associated with a customer account and is configured to store the blobs of data; storing one or more blobs within the container; assigning the container to one of the multiple access tiers; receiving a command to alter access capabilities associated with the container by switching access tiers; and moving the container to a different access tier responsive to the command.

In another example, the method further comprises associating a policy with the container, the policy making the one or more blobs within the container immutable with respect to deletion or modification of the one or more blobs. In another example, at least one blob of the one or more blobs is re-positionable to another container having a like policy. In another example, moving the container to the different access tier alters the storage method and access capabilities for the one or more blobs within the container to comport with the moved-to tier. In another example, the method further comprises: setting a retention period under the policy for the one or more blobs; prohibiting deletion of the one or more blobs within the container until the retention period expires; and prohibiting deletion of the container until each of the one or more blobs is deleted or removed from the container. In another example, expiration of the retention period is based on a creation date of the container plus a duration of the retention period. In another example, according to the policy, modifications to the one or more blobs are prohibited after expiration of the retention period. In another example, moving the container to the different access tier includes: copying the one or more blobs within the container from its initial storage device to a subsequent storage device associated with the different tier; verifying two copies exist of the one or more blobs on two distinct storage devices, in which the two copies are verified to be present on a same tier or multiple different tiers; and maintaining or deleting the copy of the one or more blobs on the initial storage device depending on the verification.

A further example includes one or more hardware-based non-transitory computer-readable memory devices storing instructions which, when executed by one or more processors disposed in a computing device, cause the computing device to: expose a user interface (UI) that is configured to provide output to a user and receive input from the user, the UI having visual indications on a display that identify a tier of multiple tiers which is associated with a container, the container housing and providing a directory for one or more blobs of data which are stored remotely at a remote service; receive user input at the UI to change tiers of the multiple tiers in which the container is located, wherein responsive to the user input, the user's access rights to the container, using the computing device and other devices associated with the user, changes to reflect the changed-to tier for the container; and configure a display of the UI to change indications to reflect a subsequent tier to which the container has been changed.

In another example, the blobs of data include any one or more of multimedia, documents, system backup data, log files, or metadata. In another example, the access rights for the container change for each tier of the multiple tiers, and changes in the access rights include one or more of changing the read and write performance to the one or more blobs within the container, changing monthly subscription fees associated with an account under which the container belongs, or changing individual transaction cost per read or write transaction to the one or more blobs. In another example, the executed instructions further cause the computing device to configure the UI to enable the user to create, modify, and delete a policy associated with the container, the policy including one or more restrictions on the user's handling of the one or more blobs within the container. In another example, the policy includes a restriction which permanently prohibits modifications of the one or more blobs and the policy further includes a retention period that prohibits deletions of the one or more blobs until expiration of the retention period. In another example, the retention period within the policy is determined using a date on which the policy is created plus a set duration of time.

A further example includes a computer server configured to dynamically update a remote client device's access and control capabilities over data storage containers, comprising: a network interface to interact with the remote client device; one or more processors operatively coupled to the network interface; and one or more hardware-based non-transitory memory devices storing computer-readable instructions which, when executed by the one or more processors cause the computer server to: establish a tiered infrastructure for data storage, wherein one or more data objects are stored within respective containers, and wherein each tier within the tiered infrastructure provides varying access rights and capabilities to the remote client device for accessing a respective data object depending on a tier in which the data object is located; establish immutability policies for the containers which detail a retention period for the one or more data objects within the respective container; and expose an API (Application Program Interface) which overlays both the tiered infrastructure and immutability policies, the API enabling containers to switch among tiers in the tiered infrastructure to alter the access rights and capabilities to the remote client device for the one or more data objects within the respective container while maintaining the retention period within the policy.

In another example, upon establishing the policy for a container, the container's policy is in an unlocked state which permits modification of a duration for the retention period within the policy but prohibits deletion or modification of the one or more data objects within the container. In another example, the executed instructions further cause the computer server to: receive user input to change a state of the policy; and responsive to the user input, place the unlocked container into a locked state which prohibits modification during the retention period.

In another example, the executed instructions further cause the computer server to: receive user input to change a state of the policy; and responsive to the user input, place the unlocked container into an unrestricted state which enables modifications and deletions of data objects and nulls retention periods. In another example, the API is further configured to enable switching of data objects among containers when a subsequent container possesses a same policy criterion as the previous container. In another example, upon switching tiers, the access rights and capabilities are altered by one or more of changing performance associated with data object's transmission speed, changing monthly subscription fee, or changing individual transaction costs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a computer server to dynamically switch access tiers for blobs of data within a cloud storage architecture, comprising:
    establishing a plurality of access tiers within the cloud storage architecture, each access tier utilizing different storage methods for the blobs of data stored therein, the plurality of access tiers including a frequent tier, an infrequent tier, and an archive tier, wherein the frequent tier provides greater read and write performance relative to the infrequent tier and the infrequent tier provides greater read and write performance relative to the archive tier;
    establishing one or more containers each of which is associated with a customer account and is configured to store blobs of data among the plurality of access tiers;
    storing one or more blobs of data within each container, wherein the blobs of data, containers, and account are arranged in a hierarchy in which the account comprises one or more containers, and each container comprises one or more blobs of data;
    associating immutability policies at a container level of the hierarchy, each immutability policy governing deletion and modification of the blobs of data stored in a respective container during a retention period;
    assigning each container to one of the plurality of access tiers;
    receiving a command to alter read and write performance for blobs of data stored in a container by switching access tiers;
    moving the container and stored blobs of data therein from a current access tier to a different changed-to access tier responsive to the command; and
    maintaining an immutability policy associated with the moved container at the changed-to access tier.

2. The method of claim 1, further comprising associating a policy with the container, the policy making the one or more blobs within the container immutable with respect to deletion or modification of the one or more blobs.

3. The method of claim 2, in which at least one blob of the one or more blobs is re-positionable to another container having a like policy.

4. The method of claim 3, in which moving the container to the different access tier alters the storage method and access capabilities for the one or more blobs within the container to comport with the moved-to tier.

5. The method of claim 2, further comprising:
    setting a retention period under the policy for the one or more blobs;
    prohibiting deletion of the one or more blobs within the containers until the retention period expires; and
    prohibiting deletion of the containers until each of the one or more blobs is deleted or removed from the containers.

6. The method of claim 5, in which expiration of the retention period is based on a creation date of the containers plus a duration of the retention period.

7. The method of claim 6, in which, according to the immutability policies, modifications to the one or more blobs are prohibited after expiration of the retention period.

8. The method of claim 1, in which moving the containers to the different access tier includes:
    copying the one or more blobs within the containers from its initial storage device to a subsequent storage device associated with the changed-to access tier;
    verifying two copies exist of the one or more blobs on two distinct storage devices, in which the two copies are verified to be present on a same access tier or multiple different access tiers; and
    maintaining or deleting the copy of the one or more blobs on the initial storage device depending on the verification.

9. One or more hardware-based non-transitory computer-readable memory devices storing instructions which, when executed by one or more processors disposed in a computing device, cause the computing device to:
    expose a user interface (UI) that is configured to provide output to a user, who is associated with a customer account, and receive input from the user, the UI having visual indications on a display that identify a given tier among a plurality of access tiers on which a container is located that provides remote storage for one or more blobs of data, the plurality of access tiers including a frequent tier, an infrequent tier, and an archive tier, wherein the frequent tier provides greater read and write performance relative to the infrequent tier and the infrequent tier provides greater read and write performance relative to the archive tier;
    associate an immutability policy with the container, the immutability policy governing deletion and modification of the one or more blobs of data stored in the container during a retention period, wherein the blobs of data, containers, and account are arranged in a hierarchy in which the account comprises one or more containers, and each container comprises one or more blobs of data, and wherein immutability policies are associated with a container level of the hierarchy;
    receive user input at the UI to change a current access tier among the plurality of access tiers in which the container is currently located, wherein responsive to the user input, the user's access rights to the container, using the computing device and other devices associated with the user, change to reflect the changed-to access tier for the container while maintaining the immutability policy for the container at the changed-to access tier during the retention period; and
    configure a display of the UI to change indications to reflect the changed-to access tier for the container.

10. The one or more hardware-based non-transitory computer-readable memory devices of claim 9, in which the blobs of data include any one or more of multimedia, documents, system backup data, log files, or metadata.

11. The one or more hardware-based non-transitory computer-readable memory devices of claim 9, in which the access rights for the container change for each tier of the multiple tiers, and changes in the access rights include one or more of changing the read and write performance to the one or more blobs within the container, changing monthly subscription fees associated with an account under which the container belongs, or changing individual transaction cost per read or write transaction to the one or more blobs.

12. The one or more hardware-based non-transitory computer-readable memory devices of claim 9, in which the executed instructions further cause the computing device to configure the UI to enable the user to create, modify, and delete a policy associated with the container, the policy including one or more restrictions on the user's handling of the one or more blobs within the container.

13. The one or more hardware-based non-transitory computer-readable memory devices of claim 12, in which the policy includes a restriction which permanently prohibits modifications of the one or more blobs and the policy further includes a retention period that prohibits deletions of the one or more blobs until expiration of the retention period.

14. The one or more hardware-based non-transitory computer-readable memory devices of claim 13, in which the retention period within the policy is determined using a date on which the policy is created plus a set duration of time.

15. A computer server configured to dynamically update a remote client device's access and control capabilities over data storage containers and blobs of data stored therein, comprising:
- a network interface to interact with the remote client device, wherein the remote client device is associated with a customer account, wherein the blobs of data, containers, and account are arranged in a hierarchy in which the account comprises one or more containers, and each container comprises one or more blobs of data;
- one or more processors operatively coupled to the network interface; and one or more hardware-based memory devices storing computer-readable instructions which, when executed by the one or more processors cause the computer server to:
- establish a tiered access infrastructure for data storage, wherein one or more blobs of data are stored within respective containers, and wherein each access tier within the tiered access infrastructure provides varying access rights and capabilities to the remote client device for accessing a given container depending on an access tier in which the container is located, wherein the tiered access infrastructure comprises a frequent tier, an infrequent tier, and an archive tier, wherein the frequent tier provides greater read and write performance relative to the infrequent tier and the infrequent tier provides greater read and write performance relative to the archive tier;
- associate immutability policies with the containers which govern deletion and modification of one or more blobs of data within respective containers during a retention period; and
- expose an API (Application Program Interface) which overlays both the tiered infrastructure and immutability policies, the API enabling containers, with the stored blobs of data and associated immutability policies, to be switched among access tiers in the tiered access infrastructure to alter the access rights and capabilities to the remote client device for the one or more blobs of data within the respective container while maintaining the immutability policies during the retention period for the switched containers.

16. The computer server of claim 15, in which, upon establishing the policy for a container, the container's policy is in an unlocked state which permits modification of a duration for the retention period within the policy but prohibits deletion or modification of the one or more blobs of data within the container.

17. The computer server of claim 16, in which the executed instructions further cause the computer server to:
- receive user input to change a state of the policy; and
- responsive to the user input, place the unlocked container into a locked state which prohibits modification during the retention period.

18. The computer server of claim 16, in which the executed instructions further cause the computer server to:
- receive user input to change a state of the policy; and
- responsive to the user input, place the unlocked container into an unrestricted state which enables modifications and deletions of blobs of data and nulls retention periods.

19. The computer server of claim 15, in which the API is further configured to enable switching of blobs of data among containers when a subsequent container possesses a same policy criterion as the previous container.

20. The computer server of claim 15, in which, upon switching tiers, the access rights and capabilities are altered by one or more of changing performance associated with transmission speed of blobs of data, changing monthly subscription fee, or changing individual transaction costs.

* * * * *